United States Patent [19]
Morton

[11] Patent Number: 5,835,194
[45] Date of Patent: Nov. 10, 1998

[54] APPARATUS AND METHOD FOR ALIGNING AND PRINTING INTEGRAL IMAGES

[75] Inventor: Roger Roy Adams Morton, Penfield, N.Y.

[73] Assignee: Eastman Kodak Company, Rochester, N.Y.

[21] Appl. No.: 828,637

[22] Filed: Mar. 31, 1997

[51] Int. Cl.$^6$ ............................ G03B 35/00; G03B 35/14; G03B 27/32
[52] U.S. Cl. .................... 355/22; 250/559.3; 247/248; 259/463; 396/330; 348/49
[58] Field of Search ............................... 355/22; 396/327, 396/328, 330; 347/241, 242, 256, 257, 248; 259/463; 430/946; 348/59; 250/548, 559.3

[56] References Cited

U.S. PATENT DOCUMENTS

| | | |
|---|---|---|
| 4,588,899 | 5/1986 | Erhardt . |
| 4,903,069 | 2/1990 | Lam . |
| 5,036,356 | 7/1991 | Lo . |
| 5,279,912 | 1/1994 | Telfer et al. . |
| 5,349,419 | 9/1994 | Taguchi et al. . |
| 5,424,553 | 6/1995 | Morton . |
| 5,479,270 | 12/1995 | Taylor . |
| 5,492,578 | 2/1996 | Morton . |
| 5,539,487 | 7/1996 | Taguchi et al. ............................ 355/22 |

*Primary Examiner*—A. A. Mathews
*Attorney, Agent, or Firm*—Gordon M. Stewart

[57] ABSTRACT

A method for forming a lenticular image on an image receiving medium on the back side of a lenticular lens sheet, which sheet has a plurality of generally parallel lenticules on a front side:

(a) at a sensing station, directly sensing the actual position of a reference element associated with a lenticule;

(b) writing a portion of the integral image corresponding to a lenticule associated with the reference element the actual position of which was previously sensed in step (a), on the image receiving medium in accordance with the sensed actual position; and (c) moving at least one of the lens sheet and sensing station in relation to the other, in a transverse direction in relation to the lenticules, so that another lenticule can have its associated another reference element directly sensed at the sensing station. An apparatus which can execute the method is also provided.

14 Claims, 4 Drawing Sheets

APPARATUS AND METHOD FOR ALIGNING AND PRINTING INTEGRAL IMAGES

FIELD OF THE INVENTION

The invention relates generally to the field of integral image elements which may display depth, motion or other images, and methods of making such elements.

BACKGROUND OF THE INVENTION

Integral image elements which use a lenticular lens sheet or a fly's eye lens sheet, and a three-dimensional integral image aligned with the sheet, so that a user can view the three-dimensional image without any special glasses or other equipment, are known. Such imaging elements and their construction, are described in "Three-Dimensional Imaging Techniques" by Takanori Okoshi, Academic Press, Inc., New York, 1976. Integral image elements having a lenticular lens sheet (that is, a sheet with a plurality of adjacent, parallel, elongated, and partially cylindrical lenses) are also described in the following Unites States patents: U.S. Pat. No. 5,391,254; U.S. Pat. No. 5,424,533; U.S. Pat. No. 5,241,608; U.S. Pat. No. 5,455,689; U.S. Pat. No. 5,276,478; U.S. Pat. No. 5,391,254; U.S. Pat. No. 5,424,533 and others; as well as allowed U.S. patent application Ser. No. 07/931,744. Integral image elements with lenticular lens sheets use interlaced vertical image slices which, in the case of a three-dimensional integral image, are aligned with the lenticules so that a three-dimensional image is viewable when the lenticules are vertically oriented with respect to a viewer's eyes. Similar integral image elements, such as described in U.S. Pat. No. 3,268,238 and U.S. Pat. No. 3,538,632, can be used to convey a number of individual two-dimensional scenes (such as unrelated scenes or a sequence of scenes depicting motion) rather than one or more three-dimensional images.

Integral image elements using reflective layers behind the integral image to enhance viewing of the integral image by reflected light, are also described in U.S. Pat. No. 3,751,258, U.S. Pat. No. 2,500,511, U.S. Pat. No. 2,039,648, U.S. Pat. No. 1,918,705 and GB 492,186.

In a typical method of assembling a lenticular type of integral image element, an original negative is exposed from stored digitized data of a composite lenticular image on a film writer. A suitable film writer is the Symbolic Sciences International Fire 1000 and the LVT Model 1620B, available from Light Valve Technology, a subsidiary of Eastman Kodak Company, Rochester, N.Y. A suitable negative exposure technique is disclosed in U.S. Pat. No. 5,276,478. After photographic processing, the negative is printed, typically by a projection enlarger, onto a suitable film- or paper-based photographic print stock. After processing, the lenticular composite print is coated with adhesive, aligned with a lenticular lens sheet, and pressed against the lens sheet to permanently adhere to it in proper registration with the printed lenticular composite image. However, it is also known to write the lenticular image directly onto a back side of a lenticular lens sheet which is coated with a suitable receiving layer, such as disclosed in U.S. Pat. No. 5,349,419 and U.S. Pat. No. 5,279,912. Furthermore, such "writing" of the lenticular image can be temporary, as in a display produced on a CRT or Liquid Crystal Display ("LCD") screen immediately adjacent the back side.

Since each of the lenses of a lenticular lens sheet is dedicated to a single image set of interleaved image lines, it is important that the lenticules be rotationally and translationally positioned with the image line sets, so that each set is parallel and aligned with a corresponding lenticule. Schemes for rotationally and translationally positioning a print with an overlay are disclosed in U.S. Pat. No. 5,479,270. However, by writing the image directly on the back side of the lenticular lens sheet, as disclosed in U.S. Pat. No. 5,349,419 and U.S. Pat. No. 5,279,912, an alignment step of the written image with the lenticular lens sheet is avoided.

While the width of each set of image lines may be less than or equal to the width of a lenticule, and each may be centered under its corresponding lenticule, these conditions are not essential. For example, U.S. Pat. No. 5,278,608 and U.S. Pat. No. 5,276,478 describe methods in which the image sets become increasingly spaced from the centers of their respective lenticules moving from the center to the edges of the integral image element. What is typically required is that all of the lines from only a single image can be clearly viewed from an intended (that is, preselected) viewing position in front of the lenticular lens sheet. For individual integral image elements or for short runs (that is, only a small number of copies) of integral image elements, this has been accomplished in the known art by first accurately measuring the pitch of the lenticular lens sheet to be used. The pitch, which provides the number of lens elements over a given distance, is a measure of the size of the lenticular lens elements. The spacing of the sets of image lines in the print of the integral composite image would then be selected by a suitable magnification of the original integral image (whether optically or mechanically during printing from a negative, or electronically before printing an integral image in a computer memory). Following selection of the magnification, the print would then be printed directly onto the back side of the lenticular lens sheet or onto a separate substrate (such as photographic film) with the resulting print then being aligned adjacent the back side of the lenticular lens sheet.

Increasingly, it is desired to provide more image lines (such as 10 or more) within each image line set so that more images can be seen through the lens element (such as more views for a look-around capability or more frames in a motion image sequence). This means for such "higher density lenticular images" that for a given lenticular lens sheet, each image line becomes narrower. Because of this, accurate alignment of the image line sets with respective elements becomes even more critical.

It would be desirable then, to provide a means by which relatively accurate alignment of image lines with corresponding lenticules can be obtained, even with very narrow image lines.

SUMMARY OF THE INVENTION

One of the features of the present invention is that it recognizes that for higher quality integral images in general (and lenticular images in particular) are required with a given integral lens sheet, integral lens sheet manufacturing imperfections can cause the image lines to no longer be sufficiently accurately aligned with respective lens elements for good image reproduction. For example, across a lenticular lens sheet minor variations in lens spacing (that is, the lens pitch) will cause misalignment between the lens sheet and the typical lenticular image printed based on the lens sheet manufacturer's stated lens pitch. Also, not all the lenticular lens elements may be exactly parallel with one another or the edge of the lens sheet. Some might run at a small angle to others or even be slightly curved rather than straight. This manufacturing imperfection may also result in slight misalignment which may be more noticeable with higher density integral images in particular.

There is provided then, in one aspect of the present invention, a method for forming a lenticular image on an image receiving medium on the back side of a lenticular lens sheet, which sheet has a plurality of generally parallel lenticules on a front side. The method comprising the steps of:

(a) at a sensing station, directly sensing the actual position of a reference element associated with a lenticule;

(b) writing a portion of the integral image corresponding to a lenticule associated with the reference element the actual position of which was previously sensed in step (a), on the image receiving medium in accordance with the sensed actual position wherein each portion of the image comprises one or more lines each written by an image writer in sequence in a lengthwise direction generally corresponding to the lengthwise direction of the lenticules; and (c) moving at least one of the lens sheet and sensing station in relation to the other, in a transverse direction in relation to the lenticules, so that another lenticule can have its associated another reference element directly sensed at the sensing station comparing the angular orientation of the reference element with the direction of the lines and re-orienting at least one of the lens sheet and image writer so that the reference element is angularly aligned with the lines written by the image writer.

Preferably, the method additionally comprises repeating steps (a) through (c) using each of a plurality of lenticules in sequence, so that the written portions of the lenticular image are aligned with respective lenticules whose associated reference elements were directly sensed.

In another aspect of the present invention, there is provided an apparatus for forming a lenticular image on an image receiving medium on the back side of a lenticular lens sheet, which sheet has a plurality of generally parallel lenticules on a front side. The apparatus comprises:

(a) a sensing station which directly senses, the actual location of the lenticule as the reference element by sensing the lenticule location at a plurality of positions along the length of the lenticule;

(b) an image writer to write a portion of the lenticular image corresponding to a lenticule associated with the reference element the actual position of which was previously sensed in step (a) as one or more lines each written in sequence in a lengthwise direction generally corresponding to the lengthwise direction of the lenticules;

(b1) re-positioning means for adjusting the position at which the image writer writes the image portion on the image receiving medium by adjusting the position of at least one of the image writer output and lens sheet in relation to the other, so that the image portion is written on the image receiving medium in alignment with the lenticule;

(c) means for moving at least one of the lens sheet and sensing station in relation to the other, and in a transverse direction in relation to the lenticules, so that another lenticule can have its actual position directly sensed at the sensing station;

(d) means for repeating steps (a) through (c) using each of a plurality of reference elements and lenticules in sequence, so that the written portions of the integral image are aligned with respective lenticules whose actual positions were directly sensed wherein the sensing station and writer are positioned such that the writer can write the image portion associated with each lenticule immediately after the sensing station has directly sensed the location of that same lenticule and without moving the lens sheet.

The present invention then provides a means of obtaining relatively high alignment accuracy of image segments (particularly image lines in the case of lenticular imaging) with corresponding lens elements (particularly lenticules), even with very narrow image segments (particularly image lines). This can be obtained even if there are minor deviations of the actual position of a lens element from its expected position (such as the expected position of a lenticule based on lenticular pitch). Furthermore, the present invention allows for even minor deviations in lens element shape (particularly, lenticular direction in relation to other lenticules, that is lens element "skew", or in lenticular straightness), including correcting for curved lenticules by sensing the profile of the lenticular axis and controlling image writing to track along the profile. The apparatus of the present invention is relatively simple to construct and operate.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
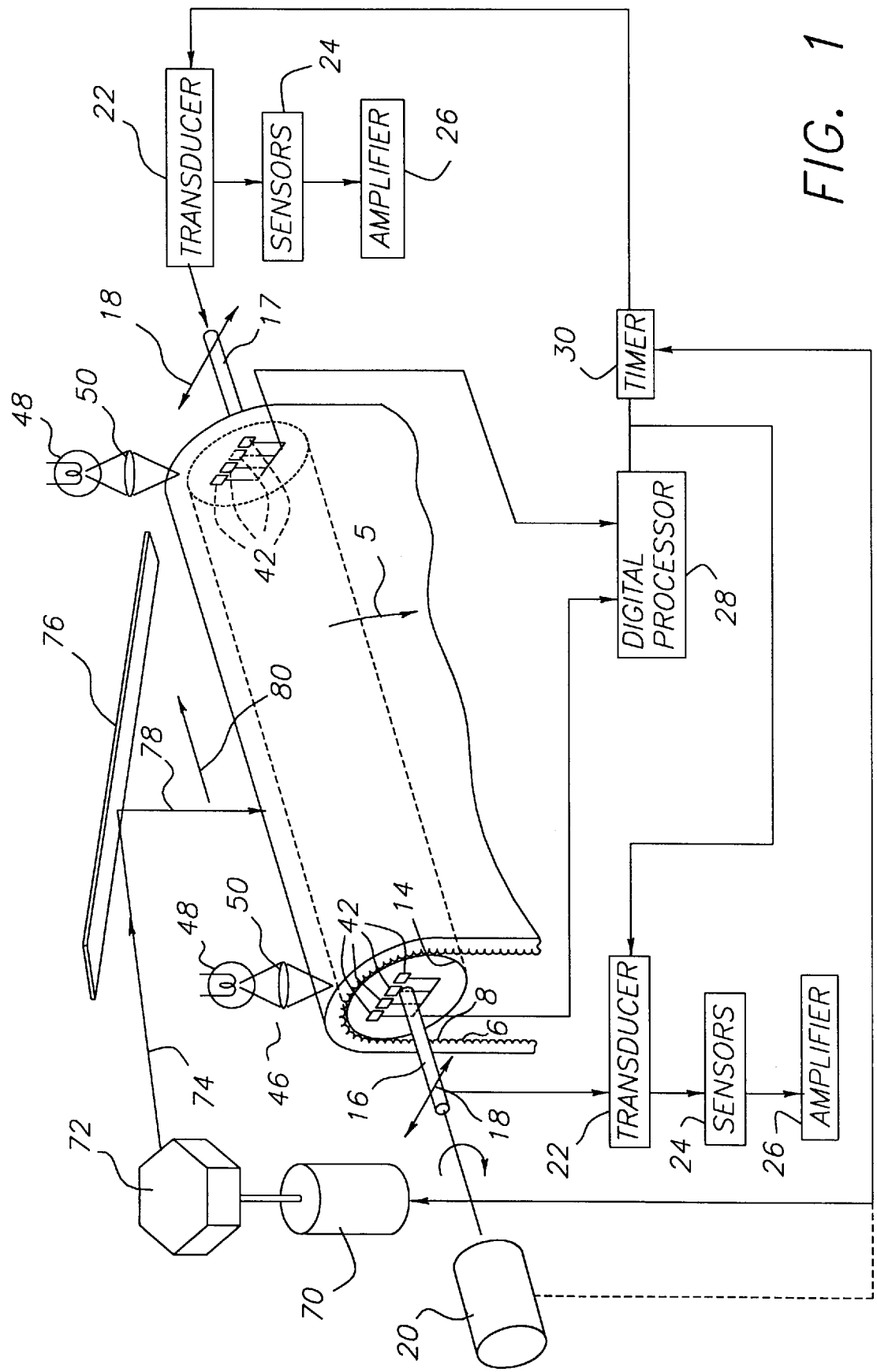
FIG. 1 is a is a perspective view of an apparatus of the present invention.

It will be appreciated in the present invention, that while the integral lens sheet could be a fly's eye lens sheet it is more preferably a lenticular lens sheet with lenticules on a front surface. Alternatively, the integral lens sheet could have regions of varying indices of refraction through its volume configured in such a way as to provide (in conjunction with the surfaces of the sheet, such as a curved external surface, flat external surface or some other shape) the same optical deflection of light rays as would be provided by a conventional fly's eye or lenticular lens sheet. Also, the back surface of the lens sheet may also be curved so as to either strengthen the lens effect or compensate for the curved focal plane which may be inherent in the lens construction. Consequently, the curvature on the back side may be of such a shape as to match the curvature of the focal plane of the lens. Further, by an "integral" composite image is referenced an image composed of segments (interlaced lines, in the case of a lenticular composite image) from at least one complete image (and often more than one image), which segments are aligned with respective individual lenses so that each of the one or more images is viewable when a user's eyes are at the correct angle relative to the imaging element. An integral lens web may be a continuous web of any integral element lens sheet type.

By "directly" sensing the position of a reference element is referenced actually identifying the position of the reference element of interest rather than calculating an assumed position based on, for example, an assumed relation with another feature on the lens sheet. Such reference elements may include the lenticules themselves, an edge of the lens sheet, some other profile which is extruded in the lens sheet, or reference marks for the entire lens sheet or a mark set which is positioned such that each mark can be used to identify variations of transverse lenticule positioning from the assumed location based on a fixed lenticular pitch, or portions of any of the foregoing. Sensing the location of indicia which are necessarily positioned with respective lenticules, is included within the concept of "directly" sensing the location. For example, determining the position of a reference mark which is positioned on each lenticule (such as a painted portion on the highest point at the end of every lenticule) is included within the concept of "directly" measuring by sensing the lenticule. This latter case can also include as sensing the location of a lens element by first altering the light absorption/reflection properties of a portion of a lens element to enhance sensor detection. One way of sensing is by illuminating at least a portion of each lens element to be sensed, and simultaneously observing the modulation of the illumination by such lens element. Alternatively, the area between lenses can be sensed or special profiles can be sensed. The reference elements used may be spaced apart in the same direction the lens elements are spaced apart (that is, transversely to the lenticules in the case of a lenticular lens sheet), and/or may be spaced along the length of one or more lenticules (such as different positions along the length of each lenticule). The first of these facilitates detection of lens pitch variations and will, for example, be spaced at least a distance equal to a lens element pitch with a total of one or more intervening lens elements (in the lens elements themselves are the reference elements, then the reference marks may be the peak of the lens elements and are therefore separated by a total of one intervening lens element). The second facilitates detection of lens skew or lens shape variations. Three, four, or more reference elements can be used in each of the two different directions across a lens sheet.

Each portion of the integral image corresponds to a lenticule "associated" with the sensed reference element. By associated is referenced an arbitrary selection of a reference element with one or more lenticules. The associated reference element may be any desired reference element such as the reference element closest to the lenticule corresponding to the image portion being written. Alternatively, it may be the second or third closest reference element to that lenticule, on any reference element located from that lenticule up to a distance selected based on the characteristics of the non-uniformity of the lenticular lens sheet or vibrations or other non-linearities introduced by the writing mechanism. For example, in the case where there is a reference element only every Nth lenticules, each reference element may be selected to be associated with the N lenticules intervening between it and the next reference element. In the case where the lenticules themselves serve as the reference element, the reference element "associated" with a lenticule will normally be that lenticule itself. Of course, more than one reference element can be associated with a given lenticule. For example, where the reference elements are lines scored or formed adjacent every Nth lenticule during manufacture of the lenticular lens sheet, the sensed actual positions of both the reference element closest to the lenticule corresponding to the image portion being written and the next closest reference element can be used together. Where the reference elements are the lenticules themselves, of course, only the one lenticule will normally be used for the function (that is, the function will simply be the location of that one lenticule).

When the sensed and required positions of a lenticule are not the same, either or both of the lens sheet and an image writer output can be re-positioned in relation to the other, so that the lenticule is in the required position (as measured with reference to the image writer output).

It will be appreciated throughout this application, by a "processor" is referenced a suitable signal processor, such as a suitably programmed general purpose digital processor or hard wired equivalent circuitry. These techniques can also be used to correct for curvature of a lenticule axis.

As to the receiving medium on which the integral image is written, this can simply be the back side of the integral lens sheet (which in a conventional integral lens sheet is opposite shaped lens surfaces, such as the semi-cylindrical shaped lens surfaces of a lenticular lens sheet). Alternatively, the image receiving medium could be one or more layers coated on the back side, such as a photosensitive layer or layers (which may in particular be any known photographic layer or layers). It will be understood though, that if a transparent substrate bearing one or more photographic layers or other writable image beariang layers using thermal or inkjet electrophotographic methods (such as the transparent base of a conventional photographic film) is attached to a lenticular lens sheet by adhering the transparent substrate, the transparent substrate can then be considered to be part of a completed lenticular lens sheet (such that the photographic layers are still part of the back side of the completed lenticular lens sheet). Additionally, the image receiving medium on the back side, can be covered with a protective layer either before or after writing the image. In the case of such a protective layer covering before writing the image, the protective layer can be transparent so that writing can be done by a light beam illuminating photosensitive layers on the back side. It will also be appreciated that the methods of the present invention can be applied to integral images (and particularly lenticular images) which can exhibit a wide range of effects including motion, depth, flip, and other lenticular related effects.

In a variation of the present invention, the method and apparatus can be used simply to determine only curvature or non-straightness of lenticules. This can be done for one or more lenticules individually, or can be one for one or more lenticules with the remainder of the lenticules being assumed to follow the same shape (or their shapes can be estimated such as by interpolation from lenticules whose curvature or non-straightness were sensed). In this arrangement the location of at least three reference elements spaced in a direction along the lenticules, is directly sensed using sensing apparatus similar to those described below before the image portions are written.

Referring first to FIG. 1, the apparatus is constructed to form a lenticular image on a lenticular lens sheet 4. Lenticular lens sheet 4 is typically of a transparent plastic material, and has a front side 6 with a plurality of elongated, generally parallel lenticules 8 with clefts 9 therebetween, and an opposite back side 10. Back side 10 is provided with an image receiving medium in the form of one or more photosensitive layers. The foregoing photosensitive layer or layers can, for example, be the typical photosensitive layers that might be found on a photographic element, such as silver halide emulsion layers respectively sensitive to red, green and blue regions of the spectrum as may be found in a full color photographic element. For reference, the general direction of lenticules 8 will be referred to as a lengthwise direction while the direction transverse thereto (such as illustrated by the arrow identified by reference numeral 5) will be referenced as a transverse direction.

The apparatus further includes a drum 14 mounted for rotation about its axis by a which lies along a shaft 16 and a shaft 17. Rotation of shaft 16 by a servo motor 20 causes rotation of drum 14. While shafts 16 and 17 are fixed so that drum 14 is prevented from movement in a vertical direction as viewed in FIG. 1, the shafts 16, 17 can be moved in a horizontal direction as viewed in FIG. 1 about either direction of a normal position of drum 14 (as indicated by arrows 18). Such horizontal movement is accomplished by means of two transducers 22 acting on respective shafts 16, 17. Shaft position sensors 24 sense the location of shafts 16, 17 in the horizontal direction, and generate corresponding signals which are sent to servo amplifiers 26 which are responding to a digital processor 28 command signals. Amplifiers 26 respond to the digital command signals from processor 28 to command the servo loop comprising motion transducers 22, position sensors 24, and amplifiers 26 (which include digital to analog conversion of data going to, or from, processor 28).

A sensing station has two lines of four sensors 42, each line of four sensors 42 being displaced from the other line along the axis of drum 14 (and hence located at different positions along a lenticule, as will be described). Each line of sensors 42 has associated with it, an illumination source 46 in the form of an electric lamp 48 and a lens which can focus collimated light from lamp 48 onto the back side 10 of lens sheet 4, through lens sheet 4 and onto the corresponding bank of sensors 42. Thus, light rays from lamps 48 are directed in accordance with the portion of the lens sheet (including the relative lenticule positions) through which it passes. Lamps 48 can emit a light spectrum to which the photosensitive layers on back side 10 are not sensitive (for example, infrared), to avoid exposing the part of such layers onto which lamps 48 illuminate and to allow better penetration of the light from lamps 48 through such layers then through the remainder of lens sheet 4 and hence onto sensors 42. Alternatively, back side 10 of lens sheet 4 may simply have no photosensitive layer coating at portions adjacent the ends of lenticules 8 (that is, the portions onto which light from lamps 48 will shine). In either event, appropriate light shielding (not shown) may be positioned around lamps 48 and lenses 50 to prevent too much scattering of light from lamps 48 back onto the photosensitive layers which are to be exposed to the image writer (described below).

In order for sensors 42 to receive light from respective lamps 48 which has passed through lens sheet 4, at least the ends of drum 14 adjacent sensors 42 should be transparent. Alternatively, the entire drum 14 may be transparent. Another arrangement is to have the entire drum 14 opaque and position each line of sensors 42 beyond respective ends of drum 14. In such case, the lenticular lens sheet 4 would be of a dimension in the direction of lenticules 8 such that when positioned on drum 14, lens sheet 4 extends beyond the ends of drum 14 and over respective lines of sensors 42.

A laser image writer includes a motor 70 which, under control of processor 28 and timer 30, controls the rotation angle of a first mirror 72. A laser assembly (not shown) provides a laser beam of three different primary colors which can be reflected in sequence off mirror 72 (as shown by beam 74) onto a second elongated rectangular mirror 76. Second mirror has an axis (that is, a line lying along its middle) which is parallel with the axis of drum 14 when drum 14 is in the normal position. Thus, a slight change in the rotational angle of first mirror 72 can cause a beam 78 of laser light to be scanned along a line 80 which is parallel to the normal axis of drum 14.

In operation of the apparatus of FIG. 1, lenticular lens sheet 4 is positioned over drum 14 with its front side 6 facing inward toward the axis of drum 14, and with lenticules 8 approximately parallel to the axis of drum 14. Note that lens sheet 14 is normally flat and thus is arranged so that as it passed over drum 14 (by rotation of drum 14 in the direction of arrow 5) it is formed into a curved (that is, partially circular) shape from its normally flat shape, then is re-formed back into its normally flat shape. When it is ready to write a lenticular image, the lenticular image is stored as a digital image signal in processor 28. Such lenticular image includes interleaved lines from multiple images, with sets of such lines (that is, image portions) to be associated by alignment with respective lenticules. It should be noted here that by alignment of a set of image lines with a lenticule only means that the set is in the desired location for the desired viewing conditions of the lenticular image. While often this may mean each set of lines is positioned symmetrically about the center of the associated lenticule, this is not necessarily the case. For example, it may be desirable that each set is progressively offset from the center of its associated lenticule. Such an arrangement is described, for example, in U.S. Pat. No. 5,278,608 and U.S. Pat. No. 5,276,478.

Next, lamps 48 which are either pulsed briefly or can be left on, illuminate through lens sheet 4 onto respective lines of sensors 42. The illumination patterns from the two lines of sensors are sent to processor 28 which can compare those patterns with patterns in memory when a lenticule 8 lies axially parallel with the image line 80 to be written by the image writer. Note that with the two lines of sensors 42 spaced along the axis of drum 14, processor 28 can determine when the lenticule with which an image line set is associated, is either transversely displaced from the required position or is out of skew with the required position (an out of skew position meaning the associated lenticule is not parallel, that is angularly aligned, with the image line 80). Thus, sensors 42 directly senses the actual location of a lenticule associated with an image line set to be written. This is converted into useful data by processor 28.

When processor 28 senses through detectors 42 that the associated lenticule is in an incorrect position (either because of incorrect transverse displacement from line 80 and/or incorrect skew with respect to it), this data is fed through to motor 20 to correct transverse displacement errors by rotating drum 14, and/or to amplifier 26 and transducers 22 to correct skew errors by moving shafts 16 and/or 17 in the direction of arrows 18. Thus, the lenticule will then be positioned as necessary to provide correct transverse and angular alignment with image line 80 to be written. Sensors in servo motor 20 provide feedback on the rotational movement of drum 14. Once the associated lenticule has been re-positioned to the correct location if required, timer 30 then causes the image writer to write a line associated with that lenticule by modulating each laser in turn and rotating mirror through motor 70, in a known manner. Meanwhile motor 20 rotates drum 14 a distance equal to the width of the line 80, and the next line of the line set associated with that lenticule is then written. This process is repeated until all lines of the line set associated with that lenticule are written.

More generally continuous motion of motor 20 moves lens sheet 4 in the transverse direction to bring the next lenticule into approximate position for the image line set associated with that next lenticule to be written. Simultaneously the foregoing sensing and any required re-positioning process occurs continuously. The continuous motion of the lenticular sheet from motor 20 coupled with the continuous scanning along line 80 causes the direction of the scan line 80 and direction of the drum axis to be at a slight angle to each other. In order for the drum axis position servo loops to correct for this the position of the sensing assembly 48, 50, and 42 at one end is in a different position than the assembly 48, 50, 42 at the other end with respect to the axis of scan lines 80. Alternatively, the electrical control signals from processor 28 to the two drum axis position servo loops need to compensate for this small angle (which is typically in the range of 0.002 degrees).

In a very slow writer the steps (sensing, any required re-positioning, writing a line set, and moving the lens sheet so that the next lenticule is in approximate position) are repeated sequentially until the entire lenticular image is written on the back side 10 of lens sheet 4.

Figure 2:
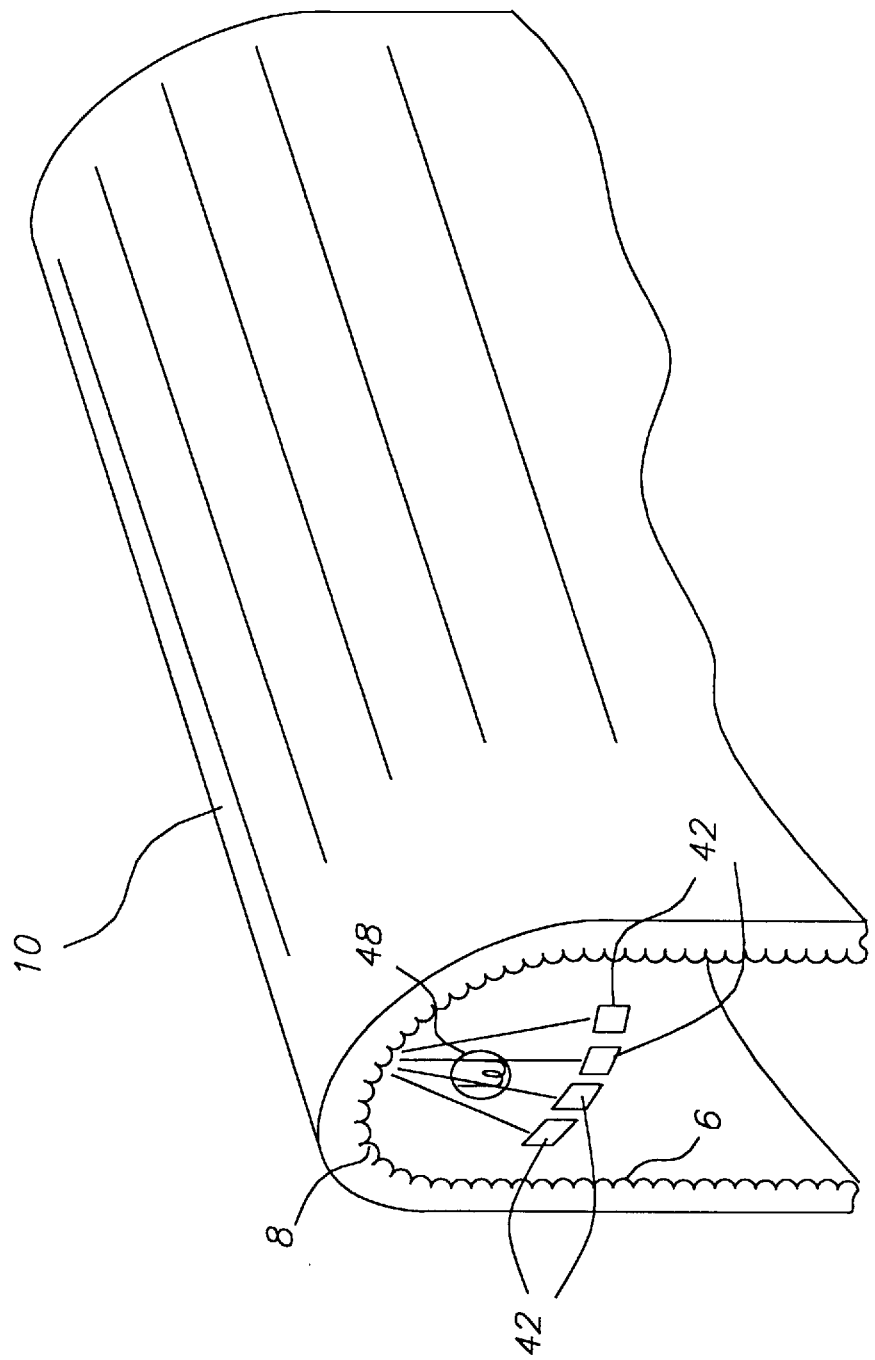
FIG. 2 is a perspective view of a portion of an alternative embodiment of an apparatus of the present invention.
Figure 3:
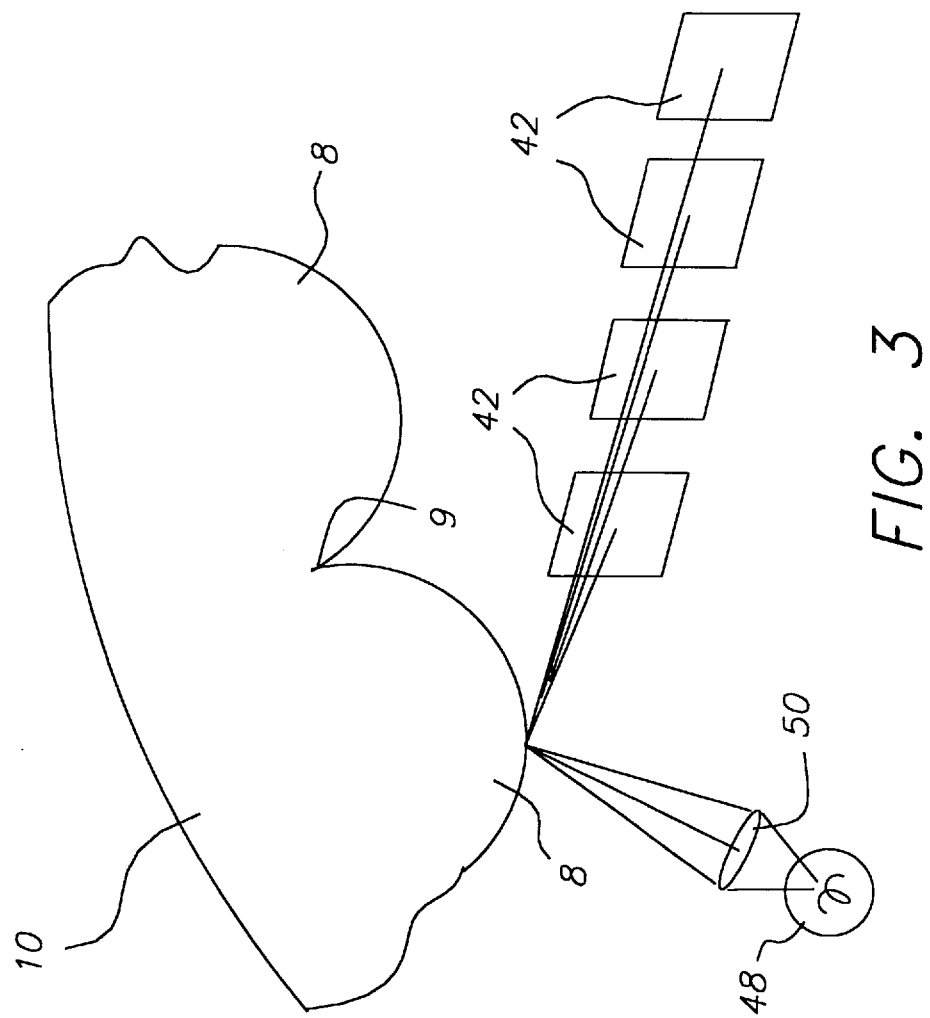
FIG. 3 is an enlarged view of a portion of FIG. 2.
Figure 4:
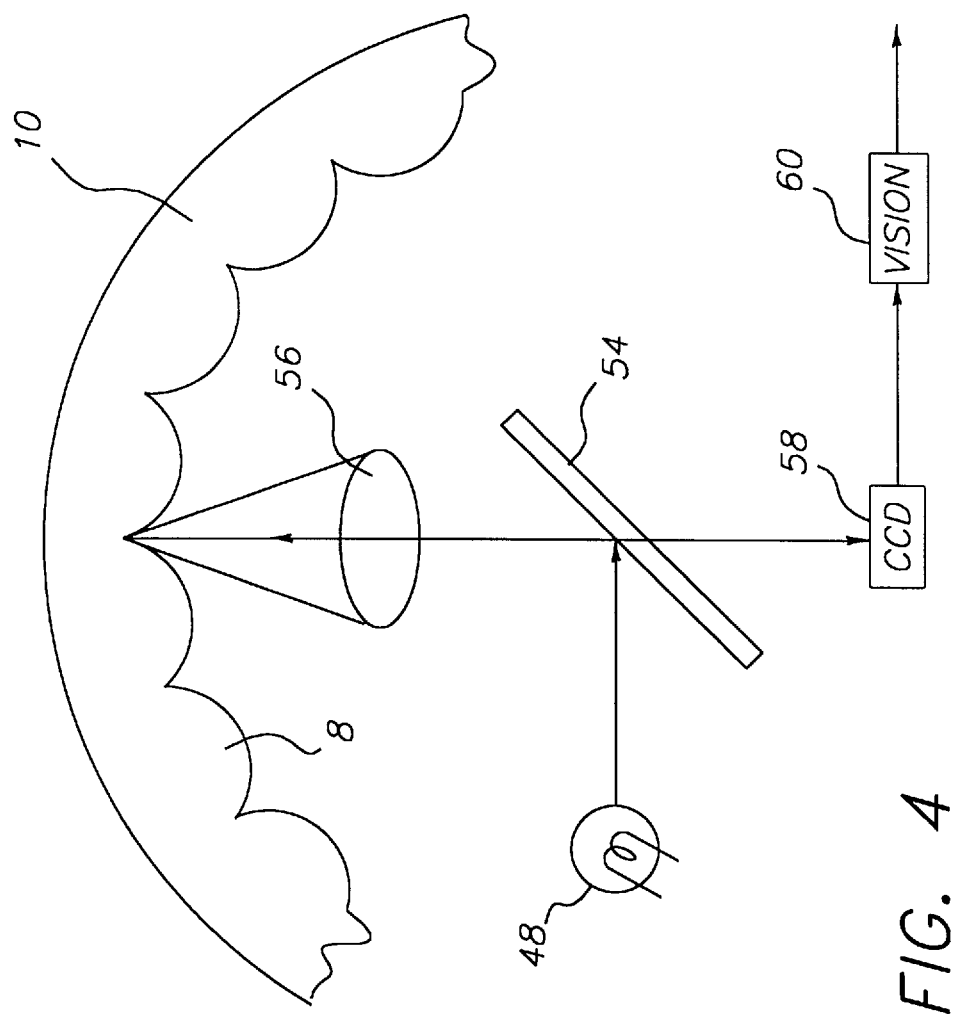
FIG. 4 is a view similar to FIG. 3 but showing a portion of another alternative embodiment of an apparatus of the present invention.

The embodiment of the apparatus of the invention in FIG. 2 is essentially the same as that of FIG. 1 except that the lamps 48 are positioned inside drum 14, and sensors 42 are arranged to receive light scattered back from front side 6. This arrangement is shown more clearly in the enlarged view of FIG. 3. In this case, processor 28 will be suitably programmed with data which allows it to analyze the pattern of back scattered light from the directly sensed lenticules. The embodiment of FIG. 4 is also the same as that of FIG. 1 except the arrangement of each end of the sensing station is different again. In particular, in FIG. 4 each lamp is arranged at either end of drum 14 to reflect off a corresponding two-way mirror 54, through a lens 56. The back scattered or reflected light from front side 6 of lens sheet 4 is again imaged through lens 56 and mirror 54 onto a linear or area array Charge Coupled Device ("CCD") or similar sensor. The image from sensor 58 is again interpreted by a suitably programmed processor in the form of processor 60, before being sent to processor 28 for determination of any error in the actual sensed position of a desired lenticule and its desired position in relation to image line 80.

From the above description, it will be seen that variations in actual lenticule position are taken into account in writing the lenticular image. In particular, the pitch of the lenticular lens sheet may in fact not be constant. However, the apparatus and method, by directly sensing the location of each lenticule can compensate for pitch variations. Similarly, if a given lenticule is not parallel to others (that is, it is skewed with respect to other lenticules), the apparatus and method will compensate for this.

It will be appreciated that various modifications to the above described apparatus and method are possible. For example, more than two lines of sensors 42 can be provided which are spaced at a plurality of locations along the axis of drum 14 (and hence along the length of the lenticules 8). Such additional lines of sensors 42 can detect other minor deviations in the shape of a given lenticule (for example, the lenticule may be curved or bent). However, for such data to be particularly useful, mirror 76 should be tiltable under control of a motor (not shown) about its axis during writing of a given image line, so that at any position along the image line being written, it can be correctly directed to the corresponding portion of the associated lenticule. Also, while an image line set associated with a given lenticule is written immediately following the direct sensing of that lenticule (after, of course and re-positioning but before sensing the position of any other lenticule), this is not essential. For example, the sensing station could be arranged to directly sense the location of a lenticule, then sense the location of further lenticules, the original location of a lenticule and its movement being stored by processor 28 in its associated memory until an image writer is reached (which image writer is not axially aligned with the normal position of drum 14. Further, once the required position of a lenticule has been compared with the actual sensed position by processor 28, the apparatus could be constructed so that processor 28, rather than re-positioning lens sheet 4, re-positions the image writer. This could be accomplished by a suitable motor under control of processor 28 to tilt mirror 76 about its axis as required, and/or laterally re-position mirror 76 (in this latter case mirror 72 may have to be re-positioned also). However, lateral re-positioning of mirror 76 is undesirable since it is preferably directly over the position at which the image line is to be written.

It will be appreciated that in the present invention, each of the steps of the methods described can be executed from suitable computer program code instructions embodied on a computer readable medium, when that medium is read by a suitable computer. Such a computer could, for example, include the components illustrated in FIG. 1. The referenced computer readable storage medium may comprise, for example: magnetic storage media such as magnetic disc (such as a floppy disc) or magnetic tape; optical storage media such as optical disc, optical tape, or machine readable bar code; solid state electronic storage devices such as random access memory (RAM), or read only memory (ROM); or any other physical device or medium employed to store a computer program.

The formation of suitable lenticular composite images by interlacing lines from different scenes, and their exposing or writing to the back side of integral imaging elements, is described for example, in U.S. Pat. No. 5,278,608, U.S. Pat. No. 5,276,478 and U.S. Pat. No. 5,455,689. The integral image can, for example, be made of two or more images of a scene taken at different perspectives (that is, at different angular positions with respect to the scene). Such an integral image, when recorded on the light sensitive layer and viewed from a position forward of the front side of the lenticular lens sheet, may provide one or more three-dimensional images. By a "three-dimensional image", is meant an integral image which, when viewed through the front side of the lens sheet (that is viewed through the lens elements), has a visible depth element as a result of the various views being relational configured to appear as the views that would be seen from different positions when actually viewing a three-dimensional object. A depth element means the ability to at least partially look around an object in the scene. This can be obtained by interlacing lines from different perspective views of the same scene, in a known manner. Thus, a three-dimensional image necessarily includes at least two views of a scene. Alternatively or additionally, the integral image may contain one or more two-dimensional images which may be recorded in alignment with the lens sheet so as to be viewable when the lenticules are angularly positioned horizontally or vertically with respect to the user's eyes. Such two-dimensional images can include images forming a motion scene when the angle of the lenticules are changed with respect to a user's eyes, or simply completely different images or images which morph into one another, as previously described above.

The invention has been described in detail with particular reference to certain preferred embodiments thereof, but it will be understood that variations and modifications can be effected within the spirit and scope of the invention.

| PARTS LIST | |
|---|---|
| 4 | Lens Sheet |
| 5, 18 | Arrows |
| 6 | Front Side |
| 8 | Lenticules |
| 9 | Clefts |
| 10 | Back Side |

-continued

PARTS LIST

| | |
|---|---|
| 14 | Drum |
| 16, 17 | Shaft |
| 20, 70 | Motors |
| 22 | Transducers |
| 24, 42, 58 | Sensors |
| 26 | Amplifiers |
| 28 | Processor |
| 30 | Timer |
| 46 | Illumination Source |
| 48 | Lamps |
| 50, 56 | Lenses |
| 60 | Processor |
| 54, 72, 76 | Mirror |
| 74, 78 | Beam |
| 80 | Line |

I claim:

1. A method for forming a lenticular image on an image receiving medium on the back side of a lenticular lens sheet, which sheet has a plurality of generally parallel lenticules on a front side, comprising the steps of:

(a) at a sensing station, directly sensing the actual position of a reference element associated with a lenticule;

(b) writing a portion of the integral image corresponding to a lenticule associated with the reference element the actual position of which was previously sensed in step (a), on the image receiving medium in accordance with the sensed actual position; wherein each portion of the image comprises one or more lines each written by an image writer in sequence in a lengthwise direction generally corresponding to the lengthwise direction of the lenticules; and (c) moving at least one of the lens sheet and sensing station in relation to the other, in a transverse direction in relation to the lenticules, so that another lenticule can have its associated another reference element directly sensed at the sensing station, comparing the angular orientation of the reference element with the direction of the lines and re-orienting at least one of the lens sheet and image writer so that the reference element is angularly aligned with the lines written by the image writer.

2. A method according to claim 1, additionally comprising:

(d) repeating steps (a) through (c) using each of a plurality of lenticules in sequence, so that the written portions of the lenticular image are aligned with respective lenticules whose associated reference elements were directly sensed.

3. A method according to claim 1 wherein the reference elements are the lenticules.

4. A method according to claim 3 wherein in step (a) the sensing station directly senses the actual position of a lenticule by sensing the lenticule location at a plurality of positions along the length of the lenticule.

5. A method according to claim 1 wherein each portion of the image comprises one or more lines each written in sequence in a lengthwise direction generally corresponding to the lengthwise direction of the lenticules.

6. A method according to claim 3 wherein step (b) is performed on the same lenticule of step (a) before directly sensing the location of another lenticule.

7. A method according to claim 3 additionally comprising comparing the sensed location of a lenticule with a required location in order to correctly align the corresponding image portion with the lenticule, and when the sensed and required locations are not the same then re-positioning one of the lens sheet and an image writer used for writing the image, in relation to the other, so that the lenticule is in the required position.

8. A method according to claim 1 wherein the lenticular lens sheet is initially planar, the method additionally comprising transversely curving the lens sheet over a cylinder, and wherein:

the position of a lenticule is directly sensed and the image portion is written, at a curved portion of the lens sheet; and the cylinder is moved about an axis to re-orient the lens sheet and image writer.

9. An apparatus for forming a lenticular image on an image receiving medium on the back side of a lenticular lens sheet, which sheet has a plurality of generally parallel lenticules on a front side, comprising:

(a) a sensing station which directly senses, the actual location of the lenticule as the reference element by sensing the lenticule location at a plurality of positions along the length of the lenticule;

(b) an image writer to write each portion of the lenticular image corresponding to a lenticule associated with the reference element the actual position of which was previously sensed in step (a) as one or more lines each written in sequence in a lengthwise direction generally corresponding to the lengthwise direction of the lenticules;

(b1) re-positioning means for adjusting the position at which the image writer writes the image portion on the image receiving medium by adjusting the position of at least one of the image writer output and lens sheet in relation to the other, so that the image portion is written on the image receiving medium in alignment with the lenticule;

(c) means for moving at least one of the lens sheet and sensing station in relation to the other, and in a transverse direction in relation to the lenticules, so that another lenticule can have its actual position directly sensed at the sensing station;

(d) means for repeating steps (a) through (c) using each of a plurality of reference elements and lenticules in sequence, so that the written portions of the integral image are aligned with respective lenticules whose actual positions were directly sensed, wherein the sensing station and writer are positioned such that the writer can write the image portion associated with each lenticule immediately after the sensing station has directly sensed the location of that same lenticule, and without moving the lens sheet.

10. An apparatus according to claim 9 additionally comprising:

a processor to compare the directly sensed position of a lenticule from the sensing station with a required position at which the corresponding image portion is correctly aligned with the lenticule; and a re-positioning means for re-positioning one of the lens sheet and an image writer used for writing the image, in relation to the other and in response to the comparison by the processor, so that the lenticule is in the required position.

11. An apparatus method according to claim 10 wherein:

the image writer writes each portion of the image as one or more lines each written in sequence in a lengthwise direction which generally corresponds to the lengthwise direction of the lenticules;

the comparison performed by the processor includes determining the relative angular alignment of the lenticule with the direction of the lines; and wherein the re-positioning means can, in response to the relative angular alignment determined by the processor, re-orient at least one of the lens sheet and image writer so that the lenticule is angularly aligned with the lines written by the image writer.

12. An apparatus for forming a lenticular image on an image receiving medium on the back side of a lenticular lens sheet, which sheet has a plurality of generally parallel lenticules on a front side, comprising:

a roller being rotatable about an axis to transport a lenticular image sheet in a transverse direction;

drive means for rotating the roller;

a sensing station which directly senses, the actual position of a lenticule at the roller by sensing the lenticule location at a plurality of positions along the length of the lenticule;

an image writer for writing each portion of the lenticular image corresponding to a lenticule the actual position of which was previously directly sensed as one or more lines each written in sequence in a lengthwise direction which generally corresponds to the lengthwise direction of the lenticules;

a processor for comparing the directly sensed position of a lenticule from the sensing station with a required position at which the corresponding image portion is correctly aligned with the lenticule, the comparing also including determining the relative angular alignment of a lenticule with the direction of the lines;

a re-positioning means for adjusting, in response to the comparison from the processor, the position at which the image writer writes the image portion on the image receiving medium, by adjusting the position of at least one of the image writer output and lens sheet in relation to the other, so that the image portion is written on the image receiving medium in alignment with the lenticule, said re-positioning means, in response to the relative angular alignment determined by the processor, re-orienting the roller so that the lenticular is angularly aligned with the lines written by the image writer; and means for moving at least one of the lens sheet and sensing station in relation to the other and in a transverse direction in relation to the lenticules, so that another lenticule can have its actual position directly sensed at the sensing station.

13. An apparatus according to claim 12 wherein the image writer writes the one or more lines in a direction parallel to the axis of the roller when in a normal position.

14. An apparatus according to claim 12 wherein the sensing station comprises an illumination source and a detector which sense the position of a lenticule by illuminating at least a portion of the lenticule and simultaneously observing the modulation of the illumination by the lenticule.

* * * * *